US010789302B2

(12) United States Patent
Tripathi et al.

(10) Patent No.: US 10,789,302 B2
(45) Date of Patent: Sep. 29, 2020

(54) METHOD AND SYSTEM FOR EXTRACTING USER-SPECIFIC CONTENT

(71) Applicant: Innoplexus AG, Eschborn (DE)

(72) Inventors: Gaurav Tripathi, Pune (IN); Vatsal Agarwal, Rampur (IN); Sandeep Singh, Mysore (IN); Dhruv Shah, Ahmedabad (IN); Tanay Gahlot, Goa (IN)

(73) Assignee: Innoplexus AG, Eschborn (DE)

( * ) Notice: Subject to any disclaimer, the term of this patent is extended or adjusted under 35 U.S.C. 154(b) by 65 days.

(21) Appl. No.: 15/855,967

(22) Filed: Dec. 27, 2017

(65) Prior Publication Data

US 2019/0005154 A1  Jan. 3, 2019

Related U.S. Application Data

(60) Provisional application No. 62/446,423, filed on Jan. 14, 2017.

(51) Int. Cl.
| G06F 16/9038 | (2019.01) |
| G06F 16/34 | (2019.01) |
| G06F 40/169 | (2020.01) |
| G06F 40/205 | (2020.01) |
| G06F 16/9535 | (2019.01) |
| G06F 16/901 | (2019.01) |
| G06K 9/62 | (2006.01) |

(52) U.S. Cl.
CPC ........ *G06F 16/9038* (2019.01); *G06F 16/345* (2019.01); *G06F 16/9027* (2019.01); *G06F 16/9535* (2019.01); *G06F 40/169* (2020.01); *G06F 40/205* (2020.01); *G06K 9/6261* (2013.01); *G06K 9/6262* (2013.01)

(58) Field of Classification Search
CPC .................................................. G06F 16/9038
USPC ........................................................ 707/736
See application file for complete search history.

(56) References Cited

U.S. PATENT DOCUMENTS

| 2003/0023386 | A1* | 1/2003 | Aranibar | G01N 33/5091 |
| | | | | 702/19 |
| 2011/0208750 | A1* | 8/2011 | Miyazaki | G06F 16/907 |
| | | | | 707/748 |
| 2018/0075348 | A1* | 3/2018 | Zhao | G06F 21/563 |
| 2018/0365824 | A1* | 12/2018 | Yuh | G06K 9/6262 |

OTHER PUBLICATIONS

Author: Appiani et al. Title"automatic document classification and indexing in high-volume application" Date: Jun. 26, 2001 Publisher: International Journal on Document Analysis and Recognition. pp. 15 (Year: 2001).*

\* cited by examiner

*Primary Examiner* — Syling Yen
(74) *Attorney, Agent, or Firm* — Ziegler IP Law Group, LLC

(57) ABSTRACT

A method and a system for extracting user-specific content. The method is executed by a processing module. Furthermore the method includes providing target data, generating hierarchical data structure of the target data, wherein hierarchical data structure includes one or more segments, determining an importance factor for each of the one or more segments using an algorithm, identifying one or more relevant segments based on the importance factor of each of the one or more segments, and compiling one or more relevant segments to obtain the user-specific content.

16 Claims, 4 Drawing Sheets

METHOD AND SYSTEM FOR EXTRACTING USER-SPECIFIC CONTENT

CROSS REFERENCE TO RELATED APPLICATIONS

This application claims priority to U.S. Provisional Patent Application No. 62/446,423, filed Jan. 14, 2017, which is hereby incorporated by reference in its entirety.

TECHNICAL FIELD

The present disclosure relates generally to data processing; and more specifically, to methods and systems for extraction of user-specific content from target data. Moreover, the present disclosure also relates to computer readable medium containing program instructions for execution on a computer system, which when executed by a computer, cause the computer to perform method steps for extracting user-specific content.

BACKGROUND

Research plays a crucial role in advancing technological development in various fields. Specifically, research inspires innovation and promotes learning in community of scientists and inventors. Moreover, there are multiple platforms which act as information sources for researchers. Conventionally, printed media (such as books, encyclopedias, and so forth) were a primary information source of knowledge and content. However, with advancements in technology, Internet® has now replaced the printed media as an information source with easy accessibility and improved availability.

Generally, the information available on the Internet® is informative but not useful in its entirety. Specifically, a user may have to sift through hundreds of webpages to obtain content specific to needs thereof. Furthermore, information available on the Internet® is available in multiple formats. Therefore, obtaining user-specific content (namely, content catering to needs of the user), from the information available on the Internet®, may prove to be a laborious and time-consuming task. In regards to the needs of the user, the information has to be further refined to extract the user-specific content therefrom. Consequently, the primary step for extraction of user-specific content is to reduce volume of the information available on the Internet® and prepare target data. Specifically, target data may be analyzed to extract user-specific content therefrom.

Traditionally, diverse methods are employed to extract user-specific content from the information available, or specifically target data. Generally, conventional extraction methods may convert HTML text content into structured formats such as JSON, XML and the like. However, such methods cannot be generalized to obtain varied results in agreement with changing needs of the user. Consequently, the user may need to modify the method manually to suit needs thereof. Thereby, scope of acquiring the user-specific content gets constrained. Additionally, conventional extraction methods may focus mainly on un-rendered HTML content. Consequently, significant information, which may be hidden in AJAX calls and so forth, may be lost in conventional extraction methods.

Therefore, in light of the foregoing discussion there exists a need to overcome the aforementioned drawbacks associated with the conventional methods for extraction of user-specific content.

SUMMARY

The present disclosure seeks to provide a method of extracting user-specific content. The present disclosure also seeks to provide a system for extracting user-specific content. The present disclosure seeks to provide a solution to the existing problem of unmanageable, unstructured, time consuming and inefficient extraction of user-specific content. An aim of the present disclosure is to provide a solution that overcomes at least partially the problems encountered in prior art, and provide a seamless, faster and optimized method of extracting user-specific content from target data with a notion of importance regarding user's field of interest.

In first aspect, an embodiment of the present disclosure provides a method of extracting user-specific content, the method executed by a processing module, wherein the method comprises:
  providing target data;
  generating hierarchical data structure of the target data, wherein hierarchical data structure includes one or more segments;
  determining an importance factor for each of the one or more segments using an algorithm, wherein determining the importance factor comprises:
    extracting spatial, content and structural features from hierarchical data structure;
    determining an importance factor for one or more leaf nodes of the hierarchical data structure based on the algorithm; and
    determining an importance factor for one or more body nodes of the hierarchical data structure based on the algorithm;
  identifying one or more relevant segments based on the importance factor of each of the one or more segments; and
  compiling one or more relevant segments to obtain the user-specific content.

In second aspect, an embodiment of the present disclosure provides a system for extracting user-specific content, wherein the system comprises:
  a database arrangement operable to store target data;
  a communication module operable to retrieve target data from the database arrangement; and
  a processing module operatively coupled to the communication module, the processing module operable to:
    receive target data;
    generate hierarchical data structure of the target data, wherein hierarchical data structure includes one or more segments;
    determine an importance factor for each of the one or more segments using an algorithm, wherein determining the importance factor comprises:
      extracting spatial, content and structural features from hierarchical data structure;
      determining an importance factor for one or more leaf nodes of the hierarchical data structure based on the algorithm; and
      determining an importance factor for one or more body nodes of the hierarchical data structure based on the algorithm;
    identify one or more relevant segments based on the importance factor of each of the one or more segments; and
    compile one or more relevant segments to obtain the user-specific content.

In third aspect, an embodiment of the present disclosure provides a computer readable medium containing program instructions for execution on a computer system, which when executed by a computer, cause the computer to perform method steps for extracting user-specific content, the method comprising the steps of:
provide target data;
generating hierarchical data structure of the target data, wherein hierarchical data structure includes one or more segments;
determining an importance factor for each of the one or more segments using an algorithm, wherein determining the importance factor comprises:
extracting spatial, content and structural features from hierarchical data structure;
determining an importance factor for one or more leaf nodes of the hierarchical data structure based on the algorithm; and
determining an importance factor for one or more body nodes of the hierarchical data structure based on the algorithm;
identifying one or more relevant segments based on the importance factor of each of the one or more segments; and
compiling one or more relevant segments to obtain the user-specific content.

Embodiments of the present disclosure substantially eliminate or at least partially address the aforementioned problems in the prior art, and enables an efficient and reliable extraction of user-specific content from target data.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
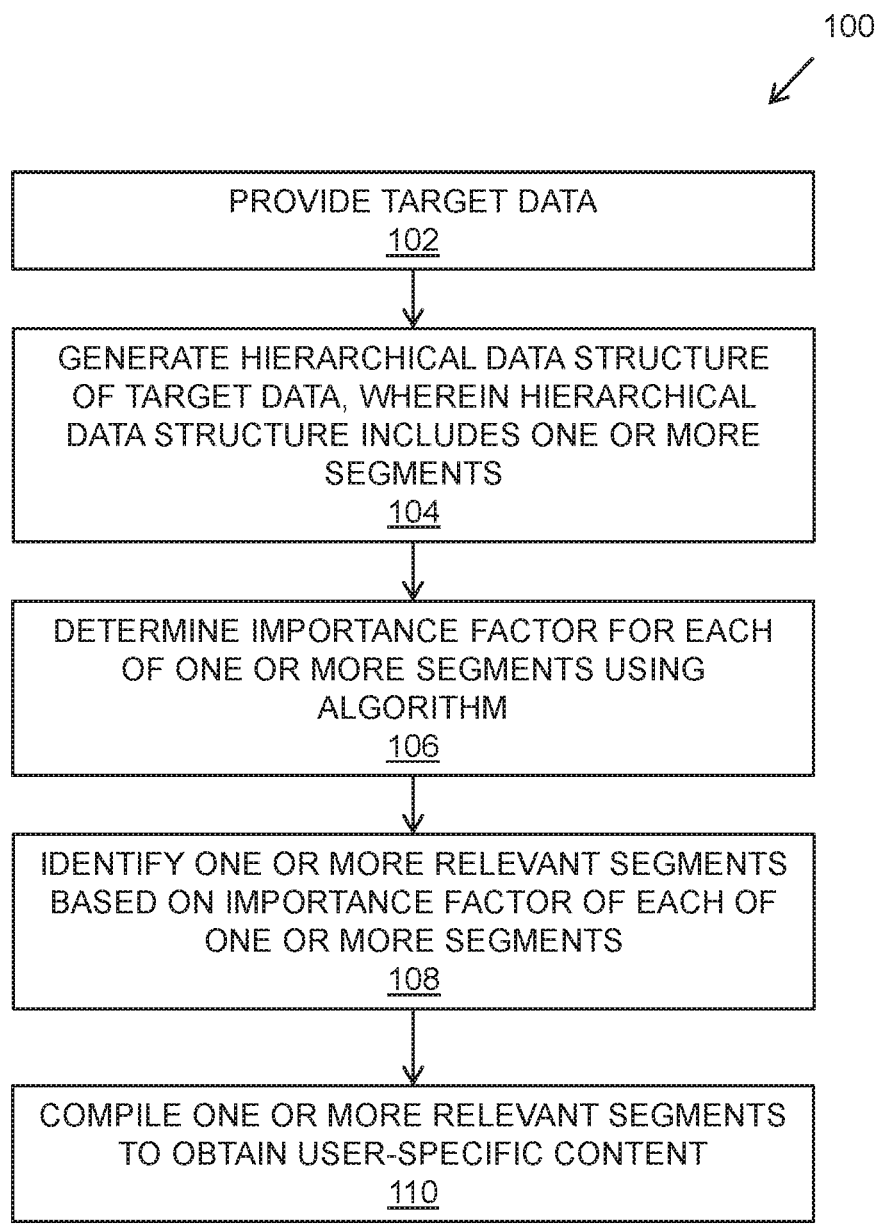
FIG. 1 is an illustration of steps of a method of extracting user-specific content, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of extracting user-specific content, the method executed by a processing module, wherein the method comprises:
providing target data;
generating hierarchical data structure of the target data, wherein hierarchical data structure includes one or more segments;
determining an importance factor for each of the one or more segments using an algorithm, wherein determining the importance factor comprises:
extracting spatial, content and structural features from hierarchical data structure;
determining an importance factor for one or more leaf nodes of the hierarchical data structure based on the algorithm; and
determining an importance factor for one or more body nodes of the hierarchical data structure based on the algorithm;
identifying one or more relevant segments based on the importance factor of each of the one or more segments; and
compiling one or more relevant segments to obtain the user-specific content.

In another aspect, an embodiment of the present disclosure provides a system for extracting user-specific content, wherein the system comprises:
a database arrangement operable to store target data;
a communication module operable to retrieve target data from the database arrangement; and
a processing module operatively coupled to the communication module, the processing module operable to:
receive target data;
generate hierarchical data structure of the target data, wherein hierarchical data structure includes one or more segments;
determine an importance factor for each of the one or more segments using an algorithm, wherein determining the importance factor comprises:
extracting spatial, content and structural features from hierarchical data structure;
determining an importance factor for one or more leaf nodes of the hierarchical data structure based on the algorithm; and
determining an importance factor for one or more body nodes of the hierarchical data structure based on the algorithm;
identify one or more relevant segments based on the importance factor of each of the one or more segments; and compile one or more relevant segments to obtain the user-specific content.

The present disclosure provides a system and method of extracting user-specific content and enables efficient and reliable extraction of user-specific content from target data. Furthermore, the method of the present disclosure is operable to aggregate target data available in multiple formats to a user-specific content in a readable and structured format. Beneficially, the present disclosure provides user with an efficient method involving reduced processing and time complexity. Moreover, the method aims at decreasing huge volume of information contained in the target data to an easily manageable set of user-specific content. Additionally, the method can be generalized for multiple formats of target data to widen the domain of extraction of content related to the user's field of interest. Specifically, there is a significant reduction in loss of information as every section of the target data is analyzed and labeled during the process of extracting the user-specific content. Consequently, the method performs extraction of user-specific data with an understanding regarding notion of importance of contents of the target data Throughout the present disclosure, the term "user-specific content" relates to information pertaining to a field of user's interest. Specifically, the user-specific content may be structured data (namely facts and/or figures) pertaining to the field of user's interest. Furthermore, the user-specific content may be in form of text, image, audio, video, or any combination thereof. Optionally, the user-specific content may be for research purposes, academic studies, market analyses and so forth. In an example, for a user who wants to perform a market analysis in order to open a five star hotel in Brisbane, the user-specific content may be a number of five star hotels in Brisbane, services provided by five star hotels, kind of food the hotels offer and so forth. In another example, for a user who needs to make a project on study of birds, the user-specific content may be different species of birds and features thereof.

Throughout the present disclosure, the term "target data" relates to data that needs to be analyzed in order to obtain user-specific data. Specifically, the target data may be asymmetrical, unstructured and/or unordered. Optionally, the target data may be in a portable document format (PDF), web page, Joint Photographic Experts Group. (JPEG) fie, MS-WORD file and/or a combination thereof. Furthermore, optionally, the target data may include data in a centralized data storage shared between multiple computing servers over a network. In an example, target data for the user who wants to open a five star hotel in Brisbane may be a list of all the hotels in Brisbane. In such example, the user-specific content may be extracted from such target data. In another example, target data for the user who needs to make a project on study of birds may be a database including information about birds. Optionally the target data may be a universal resource locator (URL). It may be appreciated that the target data and the user-specific content may differ for different users as per their fields of interest.

Throughout the present disclosure, the term "processing module" used herein relates to a computational element that is operable to respond to and process instructions that carry out the method. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processing module" may refer to one or more individual processors, processing devices and various elements associated with a processing device that may be shared by other processing devices. Additionally, the one or more individual processors, processing devices and elements are arranged in various architectures for responding to and processing the instructions that drive the system. The processing module is operatively coupled to the communication module. Beneficially, the coupling of processing module and communication module enables an exchange of target data and user-specific content. In an example, the processing module may classify list of hotels in Brisbane as input (namely, target data) and may provide list of five star hotels in Brisbane, services provided by them and kind of food they offer (namely, user-specific content).

As mentioned previously, target data is received by the processing module. The processing module is operable to receive the target data as an input and produce the user-specific content as output thereof. Optionally, the processing module may be a computer-implemented module. More optionally, the target data may be provided by means of a graphical user interface (GUI), command line (cmd), drag and drop, and so forth.

The system for extracting user-specific content comprises a database arrangement operable to store target data. The database arrangement is operable to store target data. Optionally, the database arrangement is operable to store user-specific content. Furthermore, the database arrangement may be a relational or NoSQL database.

Throughout the present disclosure, the term "database arrangement" as used herein relates to an organized body of digital information regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. Furthermore, the database arrangement refers to the software program for creating and managing one or more databases. Optionally, the database arrangement may be operable to supports relational operations, regardless of whether it enforces strict adherence to the relational model, as understood by those of ordinary skill in the art. Additionally, the database arrangement populated by data elements. Furthermore, the data elements may include data records, bits of data, cells are used interchangeably herein and all intended to mean information stored in cells of a database.

Furthermore, the system for extracting user-specific content comprises a communication module operable to retrieve the target data from the database arrangement. The communication module can be software, hardware, firmware and/or a combination thereof. Specifically, the communication module is capable of transmitting data from one or more module and/or device to another one or more module and/or device. Optionally, the communication module may be connected to the database arrangement using a wired and/or a wireless connection. Specifically, the communication module may retrieve target data from the database arrangement using a network. Examples of the network may include, but are not limited to, Furthermore, the network may include, but is not limited to, one or more peer-to-peer networks, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations.

Throughout the present disclosure, the term "communication module" relates to an arrangement of interconnected programmable and/or non-programmable components that are configured to facilitate data communication between one or more electronic devices, software modules and/or databases, whether available or known at the time of filing or as later developed. Additionally, the communication module includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed.

The method of extracting user-specific content comprises generating a hierarchical data structure of the target data, wherein hierarchical data structure includes one or more segments. Additionally, the processing module is operable to receive target data and generate the hierarchical data structure of the target data, wherein the hierarchical data structure includes one or more segments. Specifically, the hierarchical data structure forms a non-linear structure containing elements of the target data. Moreover, each element in the hierarchical data structure is connected to at least one or more other elements of the target data.

Throughout the present disclosure, the term "hierarchical data structure" relates to data elements stored in a tree structure. Specifically, the data elements stored in the hierarchical data structure may form nodes thereof. More specifically, such nodes may be a root node, leaf nodes and body nodes. Furthermore, the root node is first node (namely, a base node) and may have body node and leaf node as children thereof. Moreover, each node with a child node is a parent node. Additionally, a node that does not have a child may be a leaf node. Furthermore, nodes between the leaf nodes and the root node in the tree structure may be body nodes. Optionally, the hierarchical data structure is a Document-Object Model (DOM). Specifically, Document Object Model may speed up subsequent processing of a hierarchical data structure using depth first pass. Furthermore, the nodes of the tree structure may form one or more segments of the hierarchical data structure. Additionally, one or more segments may include text, image, audio, video, or any combination thereof.

In an example, target data may include information about classification of animals based on food preferences. In such example, the hierarchical data structure for such target data may have the data element 'animal' as the root node. Subsequently, the root node 'animal' may have the data elements 'herbivores', 'carnivores' and 'omnivores' as child nodes. Furthermore, the child node 'herbivores' may further have data elements 'cow' and 'rabbit' as child nodes thereof. In such example, the node 'herbivores' is a parent node to nodes 'cow' and 'rabbit'; and a child node for the node 'animal'. Moreover, the nodes 'cow' and 'rabbit' have no child nodes. Consequently, the nodes 'cow' and 'rabbit' are leaf nodes in the exemplary hierarchical data structure.

Optionally, generating the hierarchical data structure for the target data comprises parsing the target data to identify one or more segments thereof, wherein the one or more segments of the target data form nodes of the hierarchical data structure. Specifically, parsing includes process of analyzing contents of target data. Furthermore, parsing may divide the target data into segments (namely, elements of target data). Additionally, parsing the target data may eliminate elements thereof that may not be of importance to the user. Beneficially, parsing the target data makes it easier to be interpreted, managed and/or communicated by the processing module. In an example, target data containing information about blood types may be parsed and divided into segments containing blood types A, B and O. The target data may be further parsed (namely, broken) into segments based on Rhesus Factor (Rh) of each blood type forming nodes of a hierarchical data structure.

As mentioned previously, the method of extracting user-specific content comprises determining an importance factor for each of the one or more segments using an algorithm. Moreover, the processing module is operable to determine the importance factor for each of the one or more segments using the algorithm.

Specifically, the importance factor is parameter to determine relevance (namely, importance) of the one or more segments to the user-specific content. Specifically, importance factor relates to a score of relevance of each of the one or more segments. Additionally, a high importance factor exhibits a high relevance of one or more segments of the hierarchical data structure. Furthermore, a low importance factor exhibits a low relevance of the one or more segments of the hierarchical data structure.

In an example, for the user who wants to perform a market analysis in order to open a five star hotel in Brisbane, the one or more segments containing information about services provided and type of food offered by the five star hotels may have a high importance factor indicating a high relevance of such one or more segments. Subsequently, one or more segments containing information about staff of the hotels may have a low importance factor shows a lower relevancy of the one or more segments.

Throughout the present disclosure, the term "algorithm" relates to a process or set of rules to be followed in order to carry out a task, specifically using a computer and/or a processing module. Specifically, the algorithm provides a step-by-step instructions for carrying out a specific task. More specifically, the algorithm provides a sequence in which steps of the task are to be carried out. Beneficially, the algorithm breaks a task into smaller pieces making it easier to execute. Furthermore, the method comprises training the algorithm for determining an importance factor for each of one or more segments. Optionally, the algorithm may be a machine learning algorithm. In an example, an algorithm for solving an arithmetic equation may include instructions for solving the equation, performing mathematical operations, taking input from keyboard, handling exceptions like divide by zero and so forth.

In an embodiment, the method comprises training the algorithm using at least one of: user-specific samples, user-annotated samples. Specifically, the algorithm may be trained using machine learning techniques namely support vector machine, long short term memory and so forth. Moreover, the user-specific samples and user-annotated samples may be provided, optionally by the user, in order to train the algorithm to execute instructions for performing computations that may be required by the user.

In an embodiment, the term "user-annotated samples" as used herein relates to training samples, specific to a user, that may comprise annotations therein. Furthermore, the user-annotated samples relate to the user's field of interest. Specifically, such annotations may be analyzed by the processing module to train the algorithm for extracting relevant information from the target data. Optionally, the user-annotated samples may include labels, classes, comments, headers and so forth. More optionally, importance factor of one or more segments may be pre-determined in such user-annotated samples.

In an example, the person who wants to open a five star hotel in Brisbane may provide user-annotated samples including labels like food, services, entertainment and so forth. Optionally, the user-annotated sample may also include comments about customer ratings of the hotels.

Throughout the present disclosure, the term "user-specific samples" relates to training samples provided by user pertaining to the field of user's interest. The user-specific samples provide information regarding context of user-specific content related user's field of interest. Consequently, the user-specific samples provide information pertaining to features and semantics of user-specific content. Furthermore, the user-specific samples could be in form of text, image, audio, video, or any combination thereof. Optionally, the user specific samples may be provided in the form of XPaths. Moreover, the user-specific samples form a platform for training the algorithm to be carried out by the processing module.

In an example, the person who wants to open a five star hotel in Brisbane may provide user-specific samples containing information about services provide by five star hotels, food offered by five star hotels, images for interior of the hotels, video of lounge and so forth for training the algorithm.

In an embodiment, training the algorithm using user-specific samples may comprise generating a hierarchical data structure for the user specific samples. Optionally, the processing module may be operable to train the algorithm using user-specific samples, wherein training the algorithm includes generating a hierarchical data structure for the user-specific samples. The user-specific samples provided by the user may be parsed and a hierarchical data structure may be generated. Moreover, parsing the user-specific samples involves analyzing the user-specific samples in order to break it into its elements. Furthermore, the elements of user-specific samples form root, body and leaf nodes of the generated hierarchical data structure. Subsequently, each node of the hierarchical data structure of the user-specific samples may be connected to one or more nodes of the hierarchical data structure. Optionally, the hierarchical data structure generated may be traversed using in-order, preorder and/or post-order traversal. Furthermore, traversal of the hierarchical data structure generates information provided by the user-specific samples. In addition, the processing module may take the user-specific samples as input and parse the user-specific samples in order to generate the hierarchical data structure for the user-specific samples. Furthermore, generation of the hierarchical data structure for the user-specific samples provide a machine understandable form of the user-specific sample provided by user in order to train the algorithm.

In an embodiment, training the algorithm using user-specific samples may comprise processing the hierarchical data structure generated for the user-specific samples; wherein processing the hierarchical data structure includes annotating, and partitioning thereof. Optionally, the processing module is operable to process the hierarchical data structure generated for the user specific samples; wherein processing the hierarchical data structure comprises annotating, and partitioning thereof. Specifically, the user-specific samples may be processed to generate a specific form of training data in order to train the algorithm. Furthermore, processing the user-specific samples may include annotating the nodes of the hierarchical data structure generated for the user-specific samples. Furthermore, the annotations may be indicate the context and/or relevance of information stored at the nodes of the hierarchical data structure. Optionally, annotations may be provided by the user through a graphical user interface, using command prompt and so forth. Additionally, optionally, the annotations may be text, symbol, icon and so forth. In an example, the user-specific samples may be a list of universal resource locators (URLs) segregated by domain. In such example, for each domain, a template of XPath may be generated operable to function as a user-specific sample. Moreover, user-specific samples may be developed using a specifically-developed user-interface (UI) tool. Furthermore, subsequent to creation of XPath template for each domain, the templates may be used to annotate HTML content using a python-implemented function. Consequently, annotated HTML content segregated by domain may be generated. Moreover, optionally, processing the user-specific samples may further include validating the user-specific samples. Specifically, the user-specific samples for each domain may need to be validated as the user-specific templates created by parsing and annotating the user-specific samples may not be foolproof. Beneficially, validating the user-specific samples reduces the chance of errors in the training. In an example, validating the user-specific samples may include removing systematic errors in annotations. Additionally, domains may be discarded once validation has been performed and training data has been generated. Furthermore, processing the hierarchical data structure may also include partitioning the processed user-specific samples. Beneficially, partitioning may be performed by domain to avoid over-optimistic evaluation of system performance. Consequently, it may provide an estimate of train-test skew. In an example, once training data may be created and annotated, data partitioning and TFRecord creation may be performed using a python-implemented function. Optionally, along with partitioning, subsampling of noise class to ensure 60-40 signal to noise partition may be performed on the training data. Beneficially, the processing module processes the hierarchical data structure and provides a foolproof form of the user-specific samples. In an example, errors in annotating the nodes of the hierarchical data structure may be removed.

In an embodiment, training the algorithm using user-specific samples may comprise extracting semantic features from the processed hierarchical data structure. Optionally, the processing module is operable to train the algorithm using user-specific samples, wherein training the algorithm comprises extracting semantic features from the processed hierarchical data structure. Specifically, the extraction of semantic features from the processed hierarchical data structure may provide contextual information regarding the contents of the user-specific samples. Furthermore, the semantic features may be in form of keywords, phrases, comments and so forth. Beneficially, extraction of semantic features from the processed hierarchical data structure provide an enhanced understanding of the contents. In an example, hierarchical data structure generated for user-specific samples for study of birds may have contents such as feathers, bone, beak and so forth. Consequently in such example, the semantic features between such contents may include relations between color of feathers and color of beaks, bone structure and beak structure, and so forth. The processing module may analyze keywords present in each node of the hierarchical data structure and identify the context of a node and understand the semantic features of each of the node of the processed hierarchical data structure.

In an embodiment, training the algorithm using user-specific samples may comprise validating and testing the algorithm based on the extracted semantic features using a learning technique. Furthermore, the algorithm is tested on a test data to optimize its functioning and validated in order to discard any discrepancy in functioning of the algorithm. Optionally, training the algorithm using user-specific samples, comprises testing and validating the algorithm based on the extracted semantic features using a learning technique. The processing module performs the test run of the algorithm in order to check functioning of the algorithm and validate the algorithm based on result of the testing carried out to check the functioning thereof. Optionally, the learning technique used for testing and validating the algorithm may be backpropagation, support vector machine and so forth.

In an embodiment, the term "backpropagation" as used herein refers to a machine learning technique used for training the algorithm. Furthermore, the backpropagation machine learning technique refers to a feed backward learning scheme wherein data is propagated backward in the hierarchical data structure to the root node for purpose of training. Optionally, the learning technique may be a supervised learning technique.

In an embodiment, training the algorithm using user-annotated samples comprises generating hierarchical data structure for the user-annotated samples, wherein hierarchical data structure includes one or more segments. Furthermore, training the algorithm with user-annotated samples may produce a machine readable form of annotations (namely, labels, classes and so forth) provided by the user. Optionally, the user-annotated samples may be provided in form of XPaths. Beneficially, the user-annotated samples provide a better knowledge about the user's field of interest. The user-annotated samples may be parsed in order to generate the hierarchical data structure thereof. In an example, labelling (namely, annotating) of attributes and/or fields in the hierarchical data structure is executed on the leaf nodes of the hierarchical data structure using text, font, spatial and closeness features trained on Support vector machine model. Optionally, the processing module is operable to train the algorithm using user-annotated samples. Furthermore, the processing module may receive the user-annotated samples from the database arrangement retrieved using the communication module. The processing module may receive the user-annotated samples as input and generate hierarchical data structure thereof.

In an embodiment, training the algorithm using user-annotated samples comprises labelling the one or more segments according to one or more user-specified class. Optionally, the processing module is operable to train the algorithm using user-annotated samples, wherein training the algorithm comprises labelling the one or more segments according to one or more user-specified class. Furthermore, the nodes of hierarchical data structure generated for the user-annotated sample may be labelled based on the criteria provided by the user in order to give a better understanding of the user's field of interest. Additionally, labelling the one or more segments refers to associating an identifier with the one or more segments of the hierarchical data structure. Beneficially, the labelling of the one or more segments provide a more specific and structured form of the user-specific content. Optionally, the labelling of the one or more segments may be in form of text, symbols, icons and so forth. Furthermore, user-specified classes may represent multiple order, category and/or division of information in the user-annotated samples. Beneficially, the user-specified class provides information about the form, order and type of information required by the user. Optionally, the processing module is operable to train the algorithm using user-annotated samples, wherein training the algorithm comprises labelling the one or more segments according to one or more user-specified class. Furthermore, the processing module may be operable to associate labels in form of annotation, text, comment, symbol and so forth with the one or more segments.

In an embodiment, training the algorithm using user-annotated samples comprises extracting spatial, content and structural features from the user-annotated samples. Optionally, the spatial, content and structural features may be extracted while rendering the user-annotated sample so that it may be dis-paired with rendering of subsequent processing. Specifically, spatial features may relate to the location and positioning of one or more segments in the user-annotated samples. Moreover, the content features may relate to the type of content (such as, text, image, video) of one or more segments in the user-annotated samples. Furthermore, the structural features may relate to dimensions of the one or more segments. Beneficially, the dis-pairing helps in making task asynchronous and distributed over multiple machines. Optionally, the dis-pairing of rendering of the user-annotated samples may generalize well with a high accuracy for data extraction. The extraction of structural, content and spatial features is performed to learn the notion of relevance of data. Optionally, these feature using a feed-forward neural network for leaf and body level in order to generate an importance factor. Additionally, optionally, the processing module is operable to train the algorithm using user-annotated samples, wherein training the algorithm comprises extracting spatial, content and structural features from the user-annotated samples. The processing module is operable to calculate coordinates of contents of the user-annotated samples in order to extract spatial features of the user-annotated samples. Furthermore, the processing module may extract the semantic features of the contents of the user-annotated samples by identifying contextual meaning of elements of the user-annotated samples.

In an embodiment, training the algorithm using user-annotated samples comprises mapping the spatial, content and structural features to one or more labelled one or more segments. Furthermore, the extracted features may be combined together and may be associated with the one or more labelled segments. Beneficially, associating features with one or more labelled segments reduces chances of misinterpretation of one or more labelled segments. In an example, one or more labelled segment may contain an element 'India' that may refer to name of a person. Therefore, associating the one or more segments containing element "India" with a segment labelled with a user-specified class 'people' may reduce the chances of misinterpreting it with name of a country. Optionally, the processing module is operable to train the algorithm using user-annotated samples, wherein training the algorithm comprises mapping the spatial, content and structural features to one or more labelled segments. Furthermore, the processing module may be operable to associate the spatial, content and structural features to one or more labelled segments by calculating the location, context and layout of the user-annotated samples. Beneficially, the mapping of the spatial, content and structural features to one or more labelled segments makes the task of ordering and/or classifying user relevant data efficient.

In an embodiment, training the algorithm using user-annotated samples comprises identifying an importance factor of the one or more labelled segments using backpropagation based on the mapped user-specified classes. Optionally, the processing module is operable to train the algorithm using user-annotated samples, wherein training the algorithm comprises identifying an importance factor of the one or more labelled segments using backpropagation based on the mapped user-specified classes. Furthermore, backpropagation of data in the hierarchical data structure of the user-annotated samples based on mapped user-specified classes provides a notion of importance in the user-annotated samples. Specifically, importance factor of one or more segment in the user-annotated samples may be pre-defined by a user. The processing module may analyze the user-annotated sample and understand the notion of importance based on the pre-defined importance factors. Moreover, the algorithm trained for identifying the importance factor may be able to discard non-relevant (namely, redundant) data based on low importance factor thereof. Furthermore, identification of importance factor of the one or more labelled segments may be performed by applying deep learning techniques. Beneficially, the mapped user-specified classes provide a definite idea regarding importance of the one or more labelled segments.

In an embodiment, training the algorithm using user-annotated samples comprises identifying annotations corresponding to the extracted spatial, content and structural features in the user-annotated samples using supervised learning. Furthermore, annotations may be in form of comments, headers and so forth associated with extracted spatial, content and structural features in the user-annotated samples. Beneficially, annotations provide information related to the notion of relevance provided by the importance factor. In an example a labelled segment information about abnormal BRCA 1 and BRCA 2 genes causing breast cancer may have annotations indicating nature of the gene associated therewith. Optionally, the processing module is operable to train the algorithm using user-annotated samples, wherein training the algorithm comprises identifying annotations corresponding to the extracted spatial, content and structural features in the user-annotated samples using supervised learning. Furthermore, the processing module may be operable to extract and identify contextual meaning of annotations corresponding to the extracted spatial, content and structural features in the user-annotated samples using supervised learning. The supervised learning technique may generalize the user-annotated samples for working efficiently with unseen target data.

In an embodiment, the database arrangement is operable to store user-annotated samples and user-specific samples, wherein the user-annotated samples and user-specific samples are communicated to the processing module using the communication module. Furthermore, the user-specific samples and user-annotated samples may be stored in the database arrangement in contiguous and/or noncontiguous manner. Additionally, the user-specific samples and user-annotated samples may be indexed using indexing techniques like sequential indexing, key based indexing, hashing and so forth. In an example, the user-specific sample and user-annotated data may be accessed from the database arrangement using a structure query language (SQL) based query. Furthermore, the user-specific samples and user-annotated samples may be retrieved by the communication module and communicated to the processing module thereby.

Furthermore, determining the importance factor for the one or more segments of the hierarchical data structure of the target data comprises extracting spatial, content and structural features from hierarchical data structure. Additionally, extraction of spatial features from the hierarchical data structure provides information about location of elements (namely content, nodes and so forth) in the hierarchical data structure. Optionally, spatial features may be stored in the form of co-ordinates and/or topology. Furthermore, extraction of content features from the hierarchical data structure may provide information about the contextual field of the hierarchical data structure. Optionally, the content features may be stored in form of keywords, icons, symbols and so forth. Moreover, structural features of the hierarchical data structure provide information about layout, arrangement and/or style of the hierarchical data structure. Optionally, structural features may be stored in text format.

Moreover, determining the importance factor for the one or more segments comprises determining an importance factor for one or more leaf nodes of the hierarchical data structure based on the algorithm. Furthermore, the algorithm may be trained to compute importance factor for one or more leaf nodes based on the user-specified samples provided by the user. Additionally, determining the importance factor for the one or more segments comprises determining an importance factor for one or more body nodes of the hierarchical data structure based on the algorithm. Furthermore, the algorithm may be trained for identifying relevance of one or more body nodes to the user's field of interest based on the user-specific samples. Consequently, the algorithm may determine the importance factor for each node (namely, one or more leaf node and/or one or more body node) in form of a score and/or a rating.

As mentioned previously, the method of extracting user-specific content comprises identifying one or more relevant segments based on the importance factor of each of the one or more segments. Specifically, one or more relevant segments relate to sections of the target data that may be of relevance to a user. Moreover, the relevant information provides data of importance for carrying out research, academic study, market analysis and so forth. Furthermore, the importance factor may be backpropagated through hierarchical data structure to identify the relevant one or more segments. Furthermore, the processing module is operable to identify one or more relevant segments based on the importance factor of each of the one or more segments. Specifically, the processing module is operable to quantify the relevance of the one or more segments stored in the hierarchical data structure.

In an embodiment, identifying the one or more relevant segments based on the importance factor of the one or more segments comprises aggregating the importance factor for the one or more leaf nodes of the hierarchical data structure. Specifically, aggregation is performed to eliminate redundant and repetitive importance factors of one or more segments. Furthermore, aggregation refers to grouping of values to provide a singular value of importance factor. Beneficially, aggregation removes duplicity, quantifies importance factor (namely, relevance score), and may be backpropagated in order to identify one or more relevant segments. Moreover, backpropagating the aggregated importance factor from the one or more leaf nodes to the root of the hierarchical data structure gives relevant segments present at the lowest level of the hierarchical data structure.

In such an embodiment, identifying the one or more relevant segments based on the importance factor of one or more segments comprises aggregating the importance factor for the one or more body nodes of the hierarchical data structure to determine one or more relevant segments using backpropagation; wherein the one or more relevant segments are backpropagated to root node of the hierarchical data structure. Moreover, aggregated importance factor for the one or more body nodes of the hierarchical data structure provide a quantified relevance of information stored in the one or more segments in the body nodes of the hierarchical data structure. Beneficially, backpropagating the importance factor of the one or more segments gives the one or more relevant segments stored in the body of the hierarchical data structure.

In an embodiment, the method further comprises parsing and cleaning the hierarchical data structure based on visual cues to create a vision tree, wherein classification of identified one or more relevant segments into the information blocks is based on the vision tree. Specifically, cleaning the hierarchical data structure refers to removal of broken links, deletion of redundant comments, elimination of stylistic annotations and so forth in the hierarchical data structure. Beneficially, cleaning and parsing of the hierarchical data structure optimizes execution speed of the method. Moreover, visual cues refer to layout, font, size and other visual features of the target data. Optionally, vision tree (namely renderer tree) may be a DOM tree combine with visual cues. Furthermore, creation of vision tree based on visual cues provides a more structured layout to the identified one or more relevant segments of the hierarchical data structure. Optionally, the system for extracting user-specific content further comprises a parsing module operable to parse and clean the hierarchical data structure based on visual cues to create a vision tree, wherein classification of identified one or more relevant segments into information blocks is based on the vision tree. Furthermore, the parsing module may receive the hierarchical data structure as input and perform an analysis thereof generating a more schematized and optimal form of the hierarchical data structure.

As mentioned previously, the method of extracting user-specific content comprises compiling one or more relevant segments to obtain the user-specific content. Furthermore, compiling the one or more relevant segments generates a structured form thereof. Additionally, compiling refers to assembling information in an organized form. Furthermore, the processing module is operable to compile one or more relevant segments to obtain the user-specific content. Beneficially, the processing module generates an assembled and structured form of the one or more relevant segment.

In an embodiment, compiling the one or more relevant segments comprises classifying the identified one or more relevant segments into information blocks. Additionally, classifying refers to grouping of the one or more relevant segments. Furthermore, classifying may be based on spatial, content and structural features as well as labeling performed according to one or more user-specified class. Beneficially, the classified one or more relevant segments form information blocks. Furthermore, the information blocks may refer to blocks of similar and relevant information related to user-specific content.

Optionally, classifying the identified one or more relevant segments into information blocks may comprise classifying the identified one or more relevant segments into one or more information region blocks. In an embodiment, the information blocks may be information region blocks. Furthermore, the information region blocks may be a section of user-specific content. In an example, the information region block may contain more than one relevant segment. Additionally, optionally, classifying the identified one or more relevant segments into information blocks may comprise: classifying the one or more information blocks into one or more information records. Furthermore, the one or more information record may refer to one or more relevant segments. In an example, a table containing information about employees of a company in relational database management system may be an information region block. Moreover, a single row of information about an employee may be an information record.

In an embodiment, compiling the one or more relevant segments comprises annotating the information blocks with one or more labels using the algorithm to obtain the user-specific content. Moreover, the algorithm used for annotating the information blocks may be trained with user-annotated samples and/or user-specific samples. Beneficially, annotating the information blocks provides additional information about the one or more relevant segments. Optionally, annotating information blocks with one or more labels may comprise extracting spatial, content and structural features of the information blocks. Furthermore, extracting spatial, content and structural features of the information blocks may provide information about the subject and context of the one or more information block. Consequently, annotations for the one or more information block may include relevant text, comment, keyword, symbol, icon and so forth. In an example, labels may be metadata. Optionally, annotating information blocks with one or more labels may comprise annotating extracted spatial, content and structural features with one or more labels. Furthermore, extracted spatial, content and structural features may be annotated depending upon use thereof. Moreover, labels with extracted spatial, content and structural features may be text, identifier, symbol, icon and so forth. Beneficially, labeling of extracted spatial, content and structural features provides customized notion of importance regarding user-specific content.

In an exemplary implementation, the algorithm may be trained with XPath samples of multiple user-specific samples. Additionally, the algorithm may be trained to learn notion of importance (namely, importance factor) in the target data and extract user-specific content. In such implementation, a Document Object Model (DOM) tree (namely, hierarchical data structure) of user-specific samples may be created to speed up the subsequent processing. Furthermore, spatial, content and structural features may be extracted while rendering the user-specific samples. Subsequently, the extracted spatial, content and structural features may be combined using feed-forward neural network for leaf and body level of the DOM tree to identify importance factors for segments (namely, nodes) thereof. Specifically, the importance factors for leaf and body nodes may be used for training the algorithm using deep learning technique. More specifically, the deep learning technique may be backpropagation. Furthermore in such implementation, the importance factor may be backpropagated in the DOM tree to identify the most relevant segments.

In another implementation, the algorithm may be trained with user-annotated samples. In such implementation, DOM tree for the user-annotated samples may be generated and spatial, content and structural features may be extracted and labeled (namely, annotated). Optionally, loss of information may be avoided by forming an operation tree wherein special characters form a major part of feature extraction. Furthermore, once the algorithm is trained, target data as a list of URLs organized according user's field of interest may be provided as input to the trained algorithm (namely, the processing module executing the algorithm). Subsequently, a hierarchical data structure (namely, DOM tree) is generated for the target data. Furthermore, spatial, content and structural features extraction may be performed on the hierarchical data structure generated for the target data. Additionally, the spatial, content and structural features may be mapped corresponding to segments of the hierarchical data structure. Furthermore, an importance factor may be calculated for segments of the hierarchical data structure using the trained algorithm and may be backpropagated to identify relevant segments. Moreover, once the relevant segments are identified, identification of information block may be performed. Beneficially, identification of information block may eliminate processing irrelevant parts of the target data and reduce noise in feature extraction. Consequently, the hierarchical data structure with identified information blocks may be traversed. Moreover, extraction of spatial, content and structural features for the identified information blocks may be performed. Furthermore, the identified information blocks may be annotated based on the algorithm trained with user-annotated samples. Consequently, a structured user-specific content may be generated as an output of the exemplary implementation of the aforementioned method.

Furthermore, there is disclosed a computer readable medium containing program instructions for execution on a computer system, which when executed by a computer, cause the computer to perform method steps for extracting user-specific content, the method comprising the steps of providing target data; generating hierarchical data structure of the target data, wherein hierarchical data structure includes one or more segments; determining an importance factor for each of the one or more segments using an algorithm, identifying one or more relevant segments based on the importance factor of each of the one or more segments; and compiling one or more relevant segments to obtain the user-specific content. Additionally, determining the importance factor for each of the one or more segments using the algorithm comprises extracting spatial, content and structural features from hierarchical data structure; determining an importance factor for one or more leaf nodes of the hierarchical data structure based on the algorithm; and determining an importance factor for one or more body nodes of the hierarchical data structure based on the algorithm.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated are steps of a method 100 of extracting user-specific content, in accordance with an embodiment of the present disclosure. The method 100 is executable by a processing module. At a step 102, target data is provided. At a step 104, hierarchical data structure of the target data is generated. The hierarchical data structure includes one or more segments. At a step 106, an importance factor for each of the one or more segments is determined using an algorithm. Furthermore, determining the importance factor comprises extracting spatial, content and structural features from hierarchical data structure, determining an importance factor for one or more leaf nodes of the hierarchical data structure based on the algorithm; and determining an importance factor for one or more body nodes of the hierarchical data structure based on the algorithm. At a step 108, one or more relevant segments are identified based on the importance factor of each of the one or more segments. At a step 110, one or more relevant segments are compiled to obtain user-specific content.

The steps 102 to 110 are only illustrative and other alternatives can also be provided where one or more steps are added, one or more steps are removed, or one or more steps are provided in a different sequence without departing from the scope of the claims herein.

Figure 2:
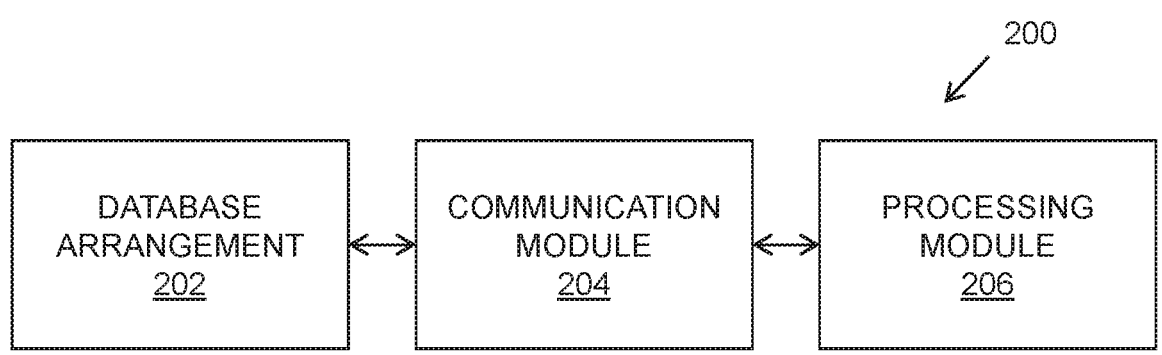
FIG. 2 is a block diagram of a system for extracting user-specific content, in accordance with an exemplary embodiment of the present disclosure.

Referring to FIG. 2, illustrated is a block diagram of a system 200 for extracting user-specific content, in accordance with an exemplary embodiment of the present disclosure. The system 200 comprises a database arrangement 202 operable to store target data. Furthermore, the system 200 comprises a communication module 204 operable to retrieve target data from the database arrangement 202. The communication module 204 is operatively coupled to the processing module 206. The processing module 206 is operable to receive target data, generate hierarchical data structure of the target data, determine an importance factor for each of the one or more segments using an algorithm, identify one or more relevant segments based on the importance factor of each of the one or more segments, and compile one or more relevant segments to obtain the user-specific content. Optionally, the database arrangement 202 is operable to store user-annotated samples and user-specific samples, wherein the user-annotated samples and user-specific samples are communicated to the processing module 206 using the communication module 204. Furthermore, the database arrangement 202 is operable to store the user-specific content received from the processing module 206 via the communication module 204.

Figure 3:
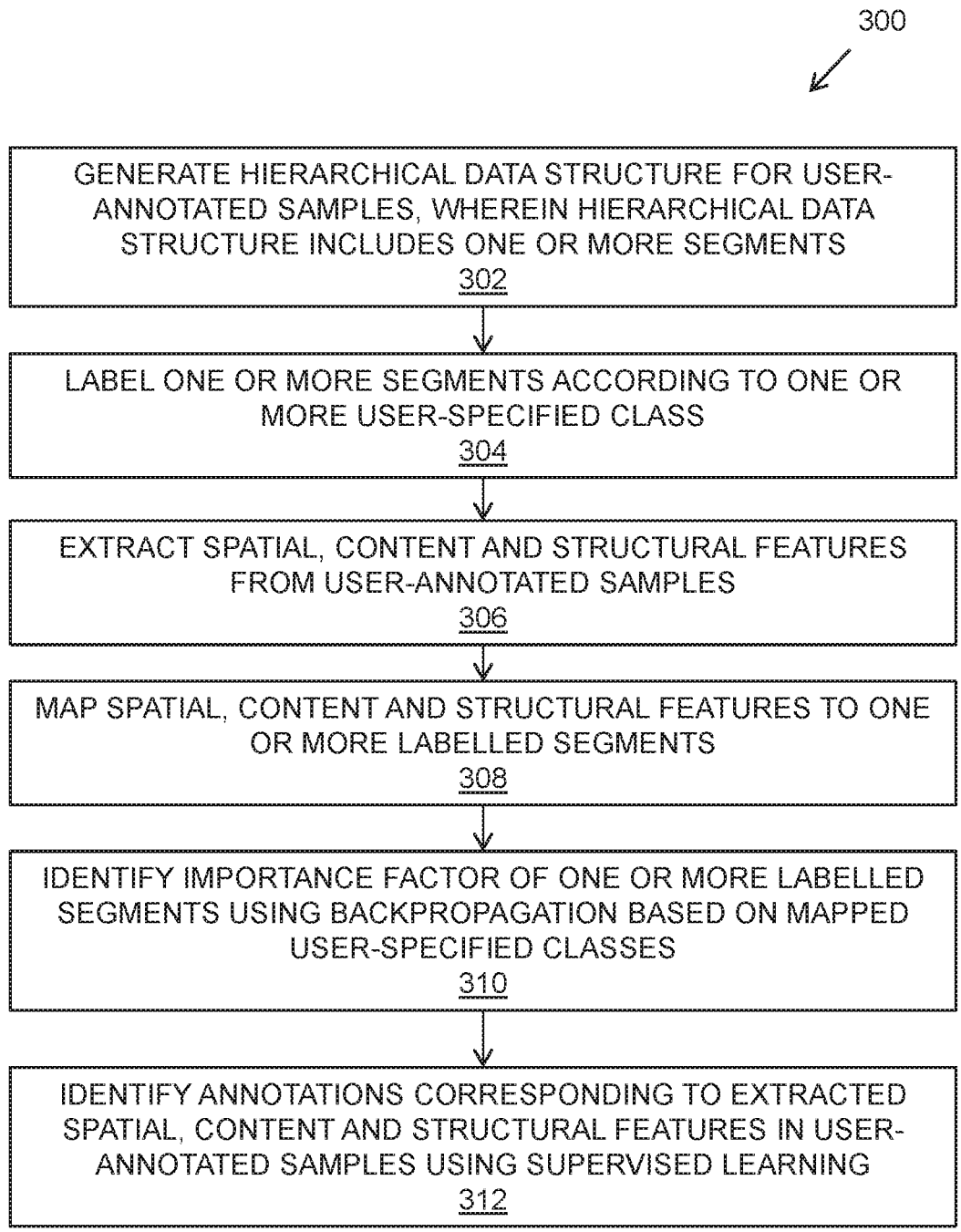
FIG. 3 is an illustration of steps of method of training the algorithm using user annotated samples, in accordance with an exemplary embodiment of the present disclosure.

Referring to FIG. 3, illustrated are steps of method 300 for training the algorithm using user annotated samples, in accordance with an exemplary embodiment of the present disclosure. At a step 302, hierarchical data structure is generated for the user annotated samples. The hierarchical data structure includes one or more segments. At a step 304, the one or more segments are labelled according to the one or more user-specified class. At a step 306, the spatial, content and structural features are extracted from the user-annotated samples. At a step 308, the spatial, content and structural features are mapped to one or more labelled segments. At a step 310, importance factor of the one or more labelled segments is identified using backpropagation based on the mapped user-specified classes. At a step 312, annotations corresponding to the extracted spatial, content and structural features in the user-annotated samples are identified using supervised learning.

Figure 4:
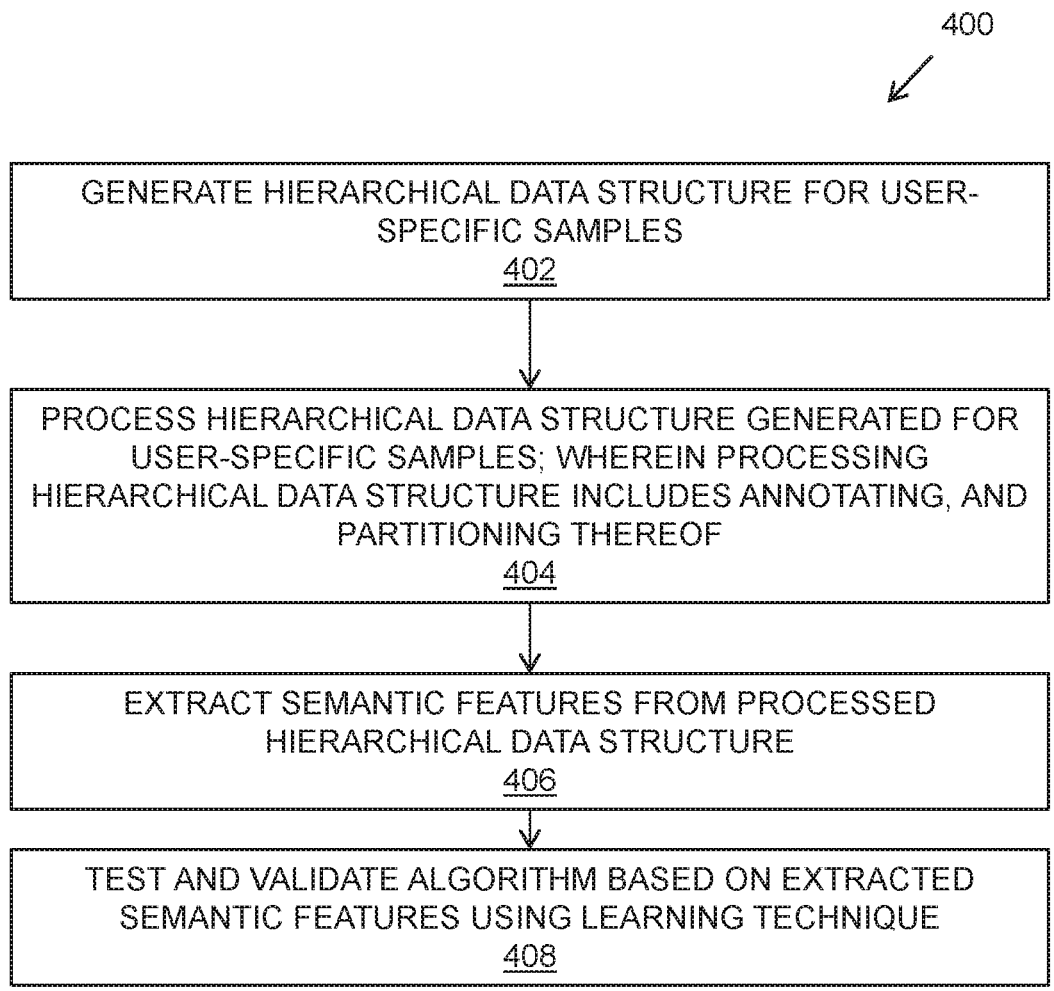
FIG. 4 is an illustration of steps of method of training the algorithm using user-specific samples, in accordance with an exemplary embodiment of the present disclosure.

Referring to FIG. 4, illustrated are steps of method 400 for training the algorithm using user-specific samples, in accordance with another exemplary embodiment of the present disclosure. At a step 402, hierarchical data structure for the user-specific samples is generated. At a step 404, the hierarchical data structure generated for the user-specific samples is processed. Specifically, processing the hierarchical data structure includes annotating, and partitioning thereof. At a step 406, semantic features are extracted from the processed hierarchical data structure. At a step 408, the algorithm is tested and validated based on the extracted semantic features using a learning technique.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of extracting user-specific content, the method executed by a processing module, wherein the method comprises:
   providing target data;
   generating a hierarchical data structure of the target data, wherein the hierarchical data structure includes one or more segments;
   determining an importance factor for each of the one or more segments using an algorithm, the importance factor being a score of relevance of each of the one or more segments, wherein determining the importance factor comprises:
      extracting spatial, content and structural features from the hierarchical data structure;
      determining an importance factor for one or more leaf nodes of the hierarchical data structure based on the algorithm; and
      determining an importance factor for one or more body nodes of the hierarchical data structure based on the algorithm;
   identifying one or more relevant segments based on the importance factor of each of the one or more segments, wherein the identifying comprises:
      aggregating the importance factor for the one or more leaf nodes of the hierarchical data structure to determine the one or more relevant segments using backpropagation; and
      aggregating the importance factor for the one or more body nodes of the hierarchical data structure to determine the one or more relevant segments using backpropagation, wherein the one or more relevant segments are backpropagated to a root node of the hierarchical data structure; and
   compiling the one or more relevant segments to obtain the user-specific content.

2. A method of claim 1, wherein compiling the one or more relevant segments comprises:
   classifying the identified one or more relevant segments into information blocks; and
   annotating the information blocks with one or more labels using the algorithm to obtain the user-specific content.

3. A method of claim 2, wherein the method further comprises parsing and cleaning the hierarchical data structure based on visual cues to create a vision tree, wherein classification of the identified one or more relevant segments into the information blocks is based on the vision tree.

4. A method of claim 1, wherein the method further comprises training the algorithm using at least one of: user-specific-samples, user-annotated-samples.

5. A method of claim 4, wherein training the algorithm using user-annotated samples comprises:
   generating a hierarchical data structure for the user-annotated samples wherein the hierarchical data structure includes one or more segments;
   labelling the one or more segments according to one or more user-specified classes;
   extracting spatial, content and structural features from the user-annotated samples;
   mapping the spatial, content and structural features to the one or more labelled segments;
   identifying an importance factor of the one or more labelled segments using backpropagation based on the mapped user-specified classes; and
   identifying annotations corresponding to the extracted spatial, content and structural features in the user-annotated samples using supervised learning.

6. A method of claim 4, wherein training the algorithm using user-specific samples comprises:
   generating a hierarchical data structure for the user-specific samples;
   processing the hierarchical data structure generated for the user-specific-samples; wherein processing the hierarchical data structure includes annotating, and partitioning thereof;
   extracting semantic features from the processed hierarchical data structure; and
   validating and testing the algorithm based on the extracted semantic features using a learning technique.

7. A method of claim 1, wherein generating hierarchical data structure for the target data comprises parsing the target data to identify the one or more segments thereof, wherein the one or more segments of the target data form nodes of the hierarchical data structure.

8. A method of claim 2, wherein classifying the identified one or more relevant segments into the information blocks comprises:
   classifying the identified one or more relevant segments into one or more information region blocks; and
   classifying the one or more information blocks into one or more information records.

9. A method of claim 2, wherein annotating the information blocks with the one or more labels comprises:
   extracting spatial, content and structural features of the information blocks; and
   annotating the extracted spatial, content and structural features with one or more labels.

10. A system for extracting user-specific content, wherein the system comprises:
   a database arrangement configured to store target data;
   a communication module configured to retrieve target data from the database arrangement; and
   a processing module coupled to the communication module, the processing module configured to:
      receive target data;
      generate a hierarchical data structure of the target data, wherein the hierarchical data structure includes one or more segments;
      determine an importance factor for each of the one or more segments using an algorithm, the importance factor being a score of relevance of each of the one or more segments, wherein determining the importance factor comprises:
         extracting spatial, content and structural features from the hierarchical data structure;
         determining an importance factor for one or more leaf nodes of the hierarchical data structure based on the algorithm; and
         determining an importance factor for one or more body nodes of the hierarchical data structure based on the algorithm;
      identifying one or more relevant segments based on the importance factor of each of the one or more segments, wherein the identifying comprises:
         aggregating the importance factor for the one or more leaf nodes of the hierarchical data structure to determine the one or more relevant segments using backpropagation; and
         aggregating the importance factor for the one or more body nodes of the hierarchical data structure to determine the one or more relevant segments using backpropagation, wherein the one or more relevant segments are backpropagated to a root node of the hierarchical data structure; and compile the one or more relevant segments to obtain the user-specific content.

11. The system of claim 10, wherein the system further comprises a parsing module configured to parse and clean the hierarchical data structure based on visual cues to create a vision tree, wherein classification of the identified one or more relevant segments into information blocks is based on the vision tree.

12. The system of claim 10, wherein the processing module is configured to train the algorithm using user-annotated samples, wherein training the algorithm comprises:

generating the hierarchical data structure for the user-annotated samples, wherein the hierarchical data structure includes one or more segments;

labelling the one or more segments according to one or more user-specified classes;

extracting spatial, content and structural features from the user-annotated-samples;

mapping the spatial, content and structural features to the one or more labelled segments;

identifying an importance factor of the one or more labelled segments using backpropagation based on the mapped user-specified classes; and identifying annotations corresponding to the extracted spatial, content and structural features in the user-annotated samples using supervised learning.

13. The system of claim 10, wherein the processing module is configured to train the algorithm using user-specific samples, wherein training the algorithm comprises:

generating a hierarchical data structure for the user-specific samples;

processing the hierarchical data structure generated for the user-specific-samples; wherein processing the hierarchical data structure includes annotating, and partitioning thereof;

extracting semantic features from the processed hierarchical data structure; and testing and validating the algorithm based on the extracted semantic features using a learning technique.

14. The system of claim 12, wherein the database arrangement is configured to store user-annotated samples, wherein the user-annotated samples are communicated to the processing module using the communication module.

15. The system of claim 13, wherein the database arrangement is configured to store user-specific samples, wherein the user-specific samples are communicated to the processing module using the communication module.

16. A non-transitory computer readable medium containing program instructions for execution on a computer, which when executed by the computer, cause the computer to perform method steps for extracting user-specific content, the method steps comprising:

providing target data;

generating hierarchical data structure of the target data, wherein hierarchical data structure includes one or more segments;

determining an importance factor for each of the one or more segments using an algorithm, the importance factor being a score of relevance of each of the one or more segments, wherein determining the importance factor comprises:

extracting spatial, content and structural features from hierarchical data structure;

determining an importance factor for one or more leaf nodes of the hierarchical data structure based on the algorithm; and determining an importance factor for one or more body nodes of the hierarchical data structure based on the algorithm;

identifying one or more relevant segments based on the importance factor of each of the one or more segments, wherein the identifying comprises:

aggregating the importance factor for the one or more leaf nodes of the hierarchical data structure to determine the one or more relevant segments using backpropagation; and aggregating the importance factor for the one or more body nodes of the hierarchical data structure to determine the one or more relevant segments using backpropagation, wherein the one or more relevant segments are backpropagated to a root node of the hierarchical data structure; and compiling the one or more relevant segments to obtain the user-specific content.

* * * * *